(12) United States Patent
Glahn

(10) Patent No.: US 6,408,692 B1
(45) Date of Patent: Jun. 25, 2002

(54) LIQUID LEVEL SENSOR

(75) Inventor: Gary W. Glahn, Eagle Creek, OR (US)

(73) Assignee: Isspro, Inc., Portland, OR (US)

( * ) Notice: Subject to any disclaimer, the term of this patent is extended or adjusted under 35 U.S.C. 154(b) by 0 days.

(21) Appl. No.: 08/975,180

(22) Filed: Nov. 20, 1997

(51) Int. Cl.$^7$ .............................................. G08B 21/00
(52) U.S. Cl. .......................... 73/313; 73/305; 73/314; 340/450.2
(58) Field of Search ............................ 73/864.13, 314, 73/313, 113, 305, 290 R; 340/450.2

(56) References Cited

U.S. PATENT DOCUMENTS

| 1,389,246 A |   | 8/1921  | Gregory et al. |
|---|---|---|---|
| 2,371,511 A |   | 3/1945  | Faus |
| 3,714,823 A |   | 2/1973  | Wilkens et al. |
| 4,028,512 A | * | 6/1977  | Fiddler ..................... 200/84 C |
| 4,066,997 A |   | 1/1978  | Ohmi et al. |
| 4,084,436 A |   | 4/1978  | Smitherman |
| 4,167,002 A | * | 9/1979  | Foley ........................ 340/612 |
| 4,253,332 A | * | 3/1981  | Sabatino et al. .............. 73/224 |
| 4,342,224 A |   | 8/1982  | Hara et al. |
| 4,637,254 A | * | 1/1987  | Dyben et al. ................. 73/314 |
| 4,706,707 A |   | 11/1987 | Betterton et al. |
| 4,920,798 A | * | 5/1990  | Weaver ....................... 73/313 |
| 4,922,764 A |   | 5/1990  | Welker |
| 4,955,231 A | * | 9/1990  | Mahoney ..................... 73/313 |
| 5,083,115 A |   | 1/1992  | Kamiya |
| 5,103,674 A |   | 4/1992  | Outwater et al. |
| 5,138,881 A | * | 8/1992  | Riley et al. ................ 73/304 R |
| 5,148,709 A | * | 9/1992  | Ross, Jr. ....................... 73/320 |
| 5,150,615 A |   | 9/1992  | Rymut et al. |
| 5,156,047 A | * | 10/1992 | Tuma et al. .............. 73/304 C |
| 5,299,456 A |   | 4/1994  | Steiner |
| 5,347,864 A |   | 9/1994  | Senghaas et al. ............. 73/313 |
| 5,357,815 A |   | 10/1994 | Williamson ................ 73/866.3 |
| 5,410,913 A | * | 5/1995  | Blackburn .................... 73/313 |
| 5,433,085 A | * | 7/1995  | Rogers ........................ 62/372 |
| 5,435,181 A |   | 7/1995  | Koebernik .................... 73/313 |
| 5,562,003 A | * | 10/1996 | Lefebvre ..................... 73/308 |
| 5,924,285 A | * | 7/1999  | Chiba .......................... 60/585 |

FOREIGN PATENT DOCUMENTS

| DD | DL0152412 | * 11/1981 | .................. 73/313 |
|---|---|---|---|
| EP | 669523 | 8/1995 | |
| GB | 2204997 | 11/1988 | |

OTHER PUBLICATIONS

"Surface Vehicle Recommended Practice", Society of Automotive Engineers, Inc., Jan. 4, 1993 (11 pgs.).

* cited by examiner

Primary Examiner—Hezron Williams
Assistant Examiner—Michael Cygan
(74) Attorney, Agent, or Firm—Dellett and Walters

(57) ABSTRACT

A liquid level sensor is provided that comprises an integral housing including therein a pickup tube, a return tube and a float cavity with a float positioned therein. Sensors are positioned within the float cavity for sensing the position of the float so as to determine the level of liquid within a tank or the like.

19 Claims, 3 Drawing Sheets

LIQUID LEVEL SENSOR

BACKGROUND OF THE INVENTION

This invention relates to sensors and, more particularly, to a liquid level sensor.

Conventional sensing devices for use in sensing the liquid level in fuel tanks include a pickup tube and a return tube positioned adjacent a float. The conventional float is fully exposed to the contents of the tank and, in the case of vehicles, is subject to wild fluctuations in the liquid level of the tank due to shaking of the tank as the vehicle drives over rough terrain. The exposed float is also subject to interference by any debris that might be floating within the tank. Moreover, the exposed pickup and return tubes, as well as the float, may become damaged by contact with the tank opening when the sensing device is installed within the tank.

SUMMARY OF THE INVENTION

In accordance with the invention, a liquid level sensor is provided that comprises an integral housing including therein a pickup tube, a return tube and a float cavity with a float positioned therein. In a preferred embodiment, a sensing board is positioned within the float cavity for sensing movement of the float along the sensing board so as to determine the level of liquid within a tank.

Accordingly, it is an object of the present invention to provide an improved liquid level sensing device comprising an integral housing having a pickup cavity, a return cavity and a central cavity with a float positioned therein.

It is a further object of the present invention to provide an improved liquid level sensing device that is not subject to wild fluctuations in the liquid level due to movement, for example, as a vehicle drives over rough terrain.

It is yet another object of the present invention to provide an improved liquid level sensing device that is not subject to interference by debris that may be floating within a tank.

It is still another object of the present invention to provide an improved liquid level sensing device that is not likely to be damaged by contact with a tank opening when the sensing device is installed within the tank.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE INVENTION

DETAILED DESCRIPTION

Figure 1:
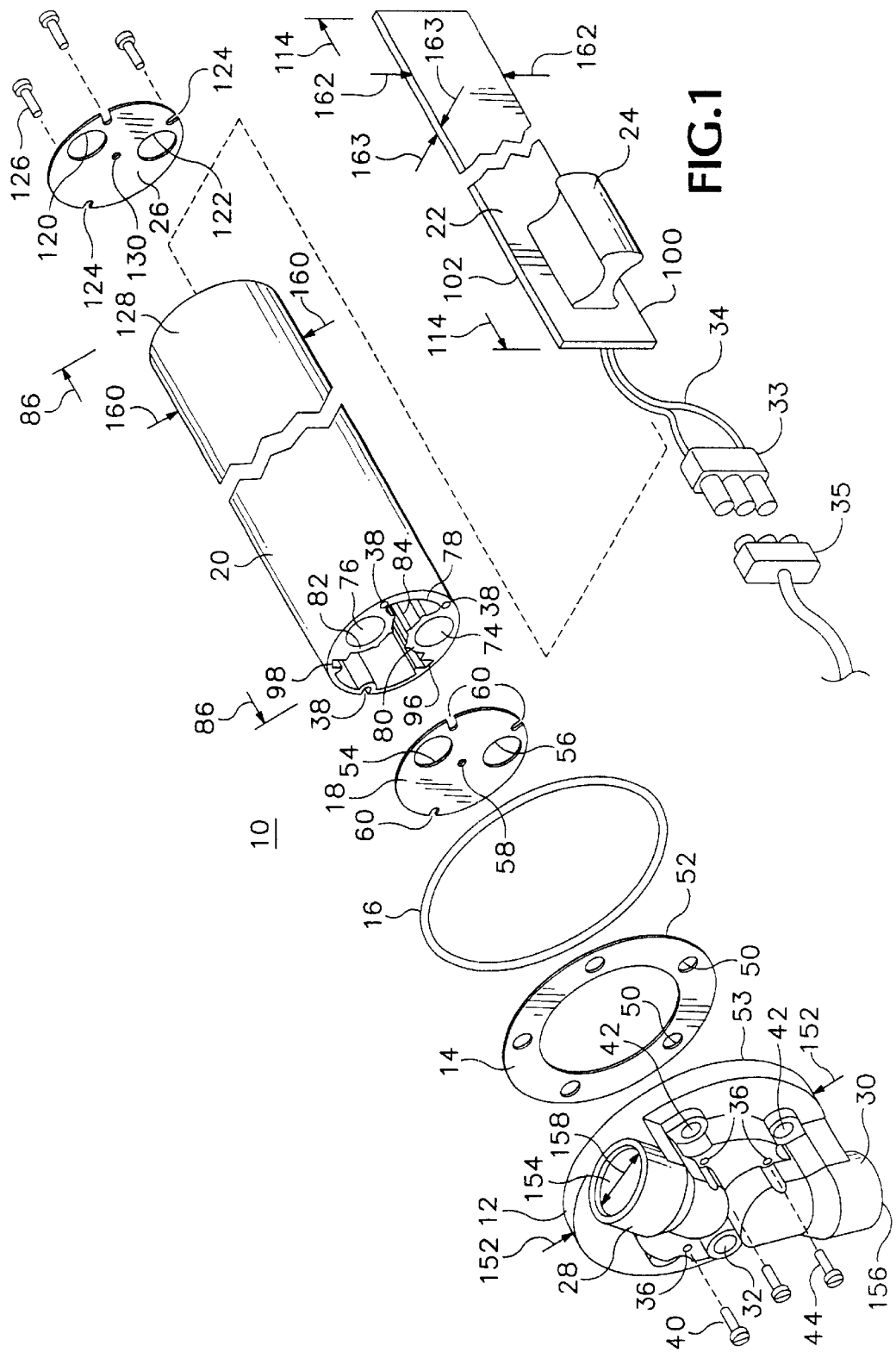
FIG. 1 is a front perspective exploded view of the liquid level sensing device.

Referring to FIG. 1, a front perspective exploded view of the liquid level sensing device, the device 10 comprises a top cap 12, a gasket 14, an O-ring 16 and a top endcap gasket 18, all mounted to the top of a housing 20. A sensing board 22 and a float 24 are positioned inside the housing and the bottom of the housing receives a bottom endcap 26. Top cap 12 includes a return inlet elbow 28, a pickup outlet elbow 30 and a wire conduit aperture 32.

Three apertures 36 are provided in top cap 12 aligned with three apertures 38 in housing 20 so as to receive fasteners 40 to secure the top cap to the housing. As will be understood by those skilled in the art, apertures 38, as well as other components of housing 20, may extend the full length of the housing if desired, so that housing 20 may be inexpensively manufactured by the process of extrusion.

Top cap 12 further includes five apertures 42 arranged in a standard pattern, as set forth in the Electrical Indicating System Specification by the Society of Automotive Engineers Surface Vehicle Recommended Practice (SAE J1810), so that the top cap is easily secured by use of five fasteners 44 to a vehicle tank opening having a standard fastener arrangement (not shown). Gasket 14 includes five apertures 50 aligned with apertures 42 in the top cap so that the top cap may be secured to the tank opening in a leak-proof manner. O-ring 16 generally is positioned around an outer edge 52 of gasket 14.

Top endcap gasket 18 is positioned between cap 12 and the top end of housing 20 and includes a return aperture 54 aligned with return inlet elbow 28, a pickup aperture 56 aligned with pickup outlet elbow 30, a wire aperture 58 aligned with wire conduit aperture 32, and three apertures 60 aligned with apertures 36 in top cap 12. Accordingly, top endcap gasket 18 may be secured between top cap 12 and housing 20 to provide a seal therebetween.

The bottom endcap 26 fits against the bottom end of housing 20 and includes a pickup aperture 122, a return aperture 120 and three apertures 124 for receiving therein fasteners 126 so as to secure the bottom endcap to the bottom end 128 of housing 20. Bottom endcap 26 further includes a small aperture 130 positioned approximately centrally thereof.

Figure 3:
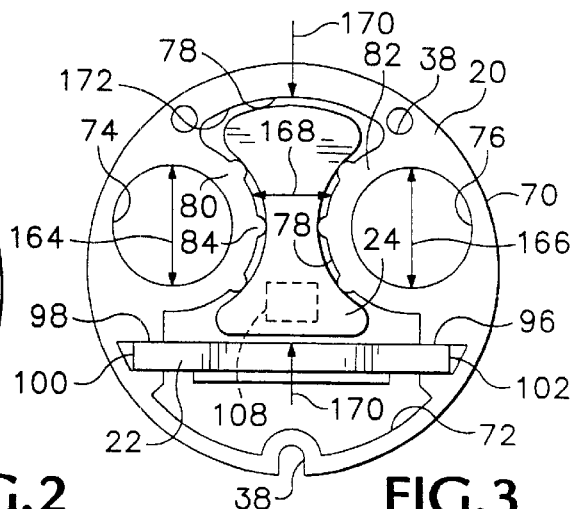
FIG. 3 is a top plan view of the housing of the liquid level sensing device.

Referring to FIG. 1 together with FIG. 3, a top plan view of the housing of the liquid level sensing device, housing 20 comprises an exterior wall 70 that encloses an interior region 72 of the housing. Exterior wall 70 preferably is cylindrical in shape so that the housing is easily placed within a tank opening.

Interior region 72 of the housing defines a pickup cavity 74, also called a pickup tube, a return cavity 76, also called a return tube, and a central float cavity 78, also called a float channel. The pickup cavity, return cavity and float cavity are each sealed with respect to each other along the longitudinal length of housing 20. In the preferred embodiment, pickup cavity 74 and return cavity 76 have a generally circular cross sectional shape. The walls 80 and 82 of the pickup tubes that are contained within the interior region 72 define a generally hourglass shaped float channel 78. The walls of the float channel preferably include plural ribs 84 that are directed inwardly into central float cavity 78 and extend substantially along the entire longitudinal length 86 (FIG. 1) of the housing. Float 24 is slidingly received within the float channel, and is free to move therewithin along the longitudinal length of housing 20. Float channel 78 further comprises elongate slots 96 and 98 positioned, respectively, adjacent inner walls 80 and 82, and extending the longitudinal length of the housing. Slots 96 and 98 are sized to receive therein side edges 100 and 102 of sensing board 22 so that the sensing board is fixedly secured within the float channel. Elongate slots 96 and 98 of the float channel position the sensing board within the housing such that the board does not hinder movement of the float along the float channel but such that the sensing board is positioned directly adjacent one face of the float.

Pickup aperture 122 and return aperture 120 of the bottom end cap 26 are aligned with the pickup and return tubes of the housing so as to communicate fluid between the interior of the housing's tubes 74 and 76 and the exterior environment of the housing.

Figure 2:
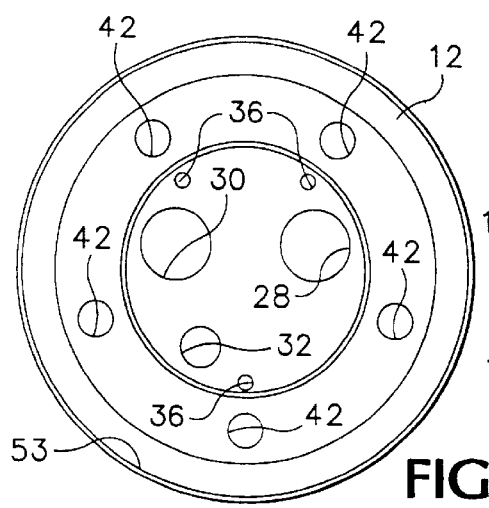
FIG. 2 is a bottom plan view of the top cap of the liquid level sensing device.

FIG. 2 is a bottom plan view of the top cap of the liquid level sensing device. In the assembled state of the device, O-ring 16 fits within a radial recess 53 of the top cap such that the top cap is double sealed to an opening where the device is installed, for example, the opening into a fuel tank.

Figure 4:
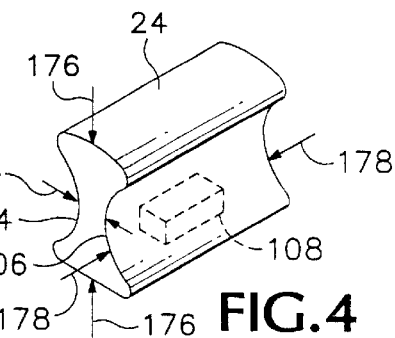
FIG. 4 is a perspective view of the float of the liquid level sensing device.

Referring to FIG. 4, a perspective view of the float of the liquid level sensing device, float 24 has a generally hourglass cross sectional shape as defined by curved sidewalls 104 and 106. Sidewalls 104 and 106 of the float preferably are spaced from one another such that the float fits within and freely moves along the length of float channel 78. The ribs 84 (FIG. 3) reduce the frictional contact of float 24 with inner walls 80 and 82 as the float moves within the float channel along the length of the housing, as dictated by the level of fuel within the tank in which the sensing device is installed. The hourglass shape of the float retains the float in an aligned configuration within the float channel along sensing board 22. The float preferably is manufactured of a closed cell foam material and includes therein a ferromagnetic material, such as a magnet 108, so as to be detected by appropriate portions of sensing board 22 as the float moves therealong.

Figure 5:
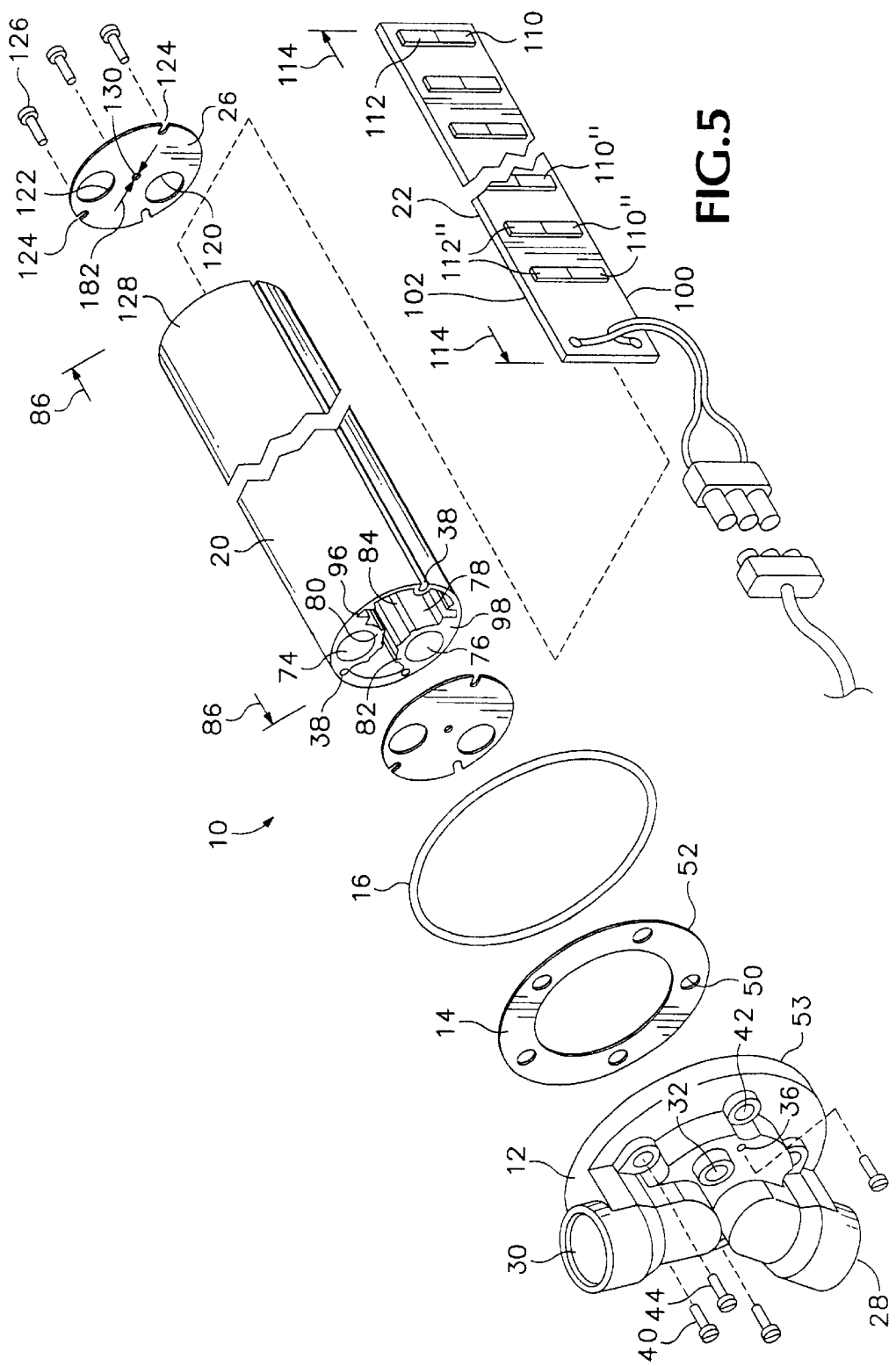
FIG. 5 is a rear perspective exploded view of the liquid level sensing device.

Referring to FIG. 5, which is a rear perspective exploded view of the liquid level sensing device, sensing board 22 includes a plurality of magnetic reed switches 110 and a plurality of resistors 112, spaced at regular intervals along a length 114 of the sensing board.

Figure 7:
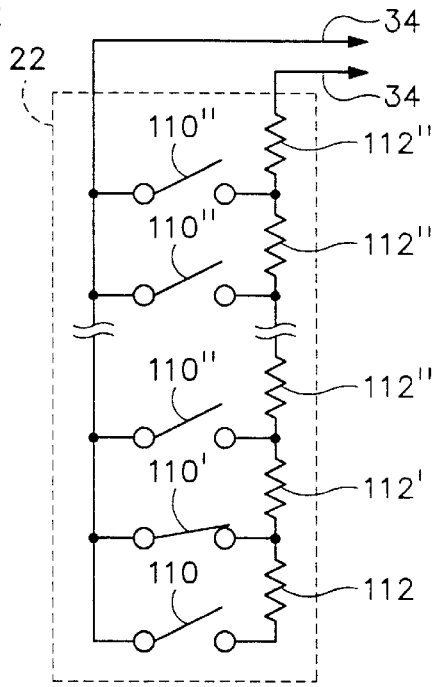
FIG. 7 is a schematic of the circuitry of the sensing board.

Referring to FIG. 7, which is a schematic of the circuitry of the sensing board, plural resistors 112 form an individual series circuit along one leg of the two sensor wires 34. Plural switches 110 are in parallel between the two wires 34, and are normally open, individual switches being connected between the junctions of adjacent ones of the resistors (with the exception of the bottommost switch 110). As the float is moved upwardly and downwardly within the float channel, different ones of the reed switches are closed by the proximity of the magnet of the float to provide a complete circuit through a different number of resistors in series to provide a resistance value to the display circuitry via wires 34, which alters the indicated fuel level shown on the display gauge (not shown). Switch 110' is shown actuated by the float magnet such that the switch is closed and the resistance value of resistor 112' plus all the resistors 112" above it is connected to the display circuitry which translates the current flow through the resistance into a fuel level reading on a level display gauge. Typical circuitry includes three steps of resistance values between 0–90Ω or eight steps between 33–268ψ (the preferred embodiment). As will be understood by one skilled in the art, the resistance values, step increments and the number of resistors and reed switches can be altered in accordance with the requirements of the particular display circuitry in use. Accordingly, as the float moves along sensing board 22 within float channel 78 as dictated by the fluid level within a tank, the gauge will show the corresponding fluid level reading.

Referring to FIGS. 1 and 5 together, as mentioned hereinabove, bottom endcap 26 further includes a small aperture 130, called a "weep" hole, that communicates between central float cavity 78 and the exterior of housing 20. Weep hole 130 is sized such that fuel easily passes from the holding area of the fuel tank to the float channel during normal fluctuations of the fuel level. The weep hole is of a sufficiently small size, however, such that the weep hole provides a damping effect when the vehicle is moving over rough terrain, for example, since the fuel level within the holding area of the vehicles fuel tank is subject to wild fluctuations as the vehicle drives over rough terrain. Sloshing of the fuel within the tank holding area, however, will not quickly be transmitted through the weep hole to the interior of the float channel and will not cause wild variations in the fuel gauge reading.

Figure 6:
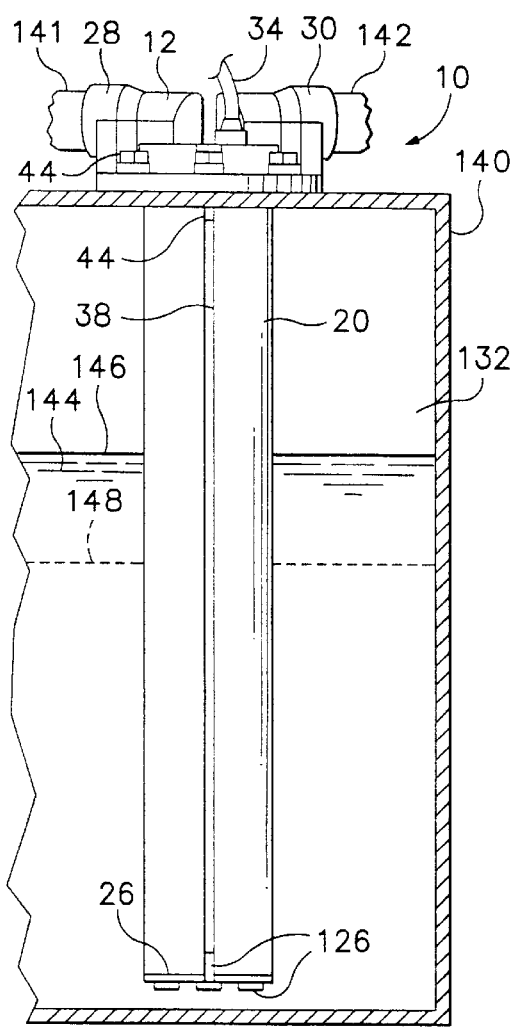
FIG. 6 is a side elevational cutaway view of the liquid level sensing device mounted in a tank.

Referring to FIG. 6, which is a side elevational cutaway view of the liquid level sensing device mounted in a vehicle fuel tank, top cap 12 is positioned exterior of a tank 140 with housing 20 extending downwardly into the internal holding area 132 of the tank. Vehicle fuel lines 141 and 142 attach to inlet and outlet elbows 28 and 30 of the top cap whereby fuel may be pumped out of the tank via pickup up tube 74 and may be returned to the tank via return tube 76. Fuel 144 contained within the tank will gradually move from a first level 146 to a second level 148 (shown in dash lines) as fuel is consumed to power the vehicle. Accordingly, float 24 will gradually move from first level 146 to second level 148 in accordance with movement of the fuel such that different ones of the reed switches on sensing board 22 will be actuated, thereby enabling the display circuitry and gauges to continually track the level of the fuel in the tank.

Top cap 12 and top endcap 18 preferably are manufactured of cast aluminum. Housing 20 is extruded aluminum. Bottom endcap 26 is preferably aluminum plate. Other durable, liquid impervious materials, as known by those skilled in the art, may also be utilized. Gasket 14, O-ring 16 and top end gasket 18 preferably are manufactured of liquid impervious flexible material such as rubber or a suitable plastic. Float 24 preferably is manufactured of a buoyant, closed cell foam that is liquid impervious and that is not easily deteriorated by continued movement along the float channel adjacent board 22 and ribs 84.

Wire conduit aperture 32 is provided for the passage of sensor wires 34 from sensing board 22 within the housing to a display gauge (not shown). Wires 34 preferably are directly connected to sensing board 22 at one end by riveting and soldering and are connected to a connector 33 exterior of the top cap at another end. The display gauge circuitry (not shown) is typically attached to a corresponding connector 35 that mates with connector 33. Accordingly, wires 34 are easily connected to a liquid level display gauge which may be positioned in a convenient location, such as on the dash board of a vehicle.

In the illustrated embodiment, top cap 12 has a diameter 152 of approximately 3.0 inches (in) (7.6 centimeters (cm)). Openings 154 and 156 of elbows 28 and 30, respectively, each have a diameter 158 of approximately 0.5 in (1.2 cm). In one embodiment, housing 20 has a length 86 of approximately 24 in (60.9 cm) and a diameter 160 of approximately 1.625 in (4.1 cm). The housing can be provided in a particular length to suit particular requirements as governed by the dimensions of the container holding the liquid (these values change as dictated by the size of the container).

Sensing board 22 has a length 114 of approximately 24 in (60.9 cm), a width 162 of approximately 1.2 in (3.0 cm) and a depth 163 of approximately 0.0625 in (0.16 cm). The sensing board may also be provided in lengths corresponding to those of the housing. Pickup and return cavities 74 and 76 have diameters 164 and 166, respectively, of approximately 0.5 in (1.27 cm). Float cavity 78 has a width 168, measured between inner walls 80 and 82, of approximately 0.6 in (1.6 cm) and a depth 170, measured from an inner wall 172 of housing 20 to sensing board 22, of approximately 1.2 in (3.1 cm). Float 24 has a width 174, measured between curved sidewalls 104 and 106, of approximately 0.2 in (0.5 cm), a height 176 of approximately 0.9 in (2.3 cm) and a length 178 of approximately 1.25 in (3.175 cm). As noted above, the arrangement of the reed switches and resistors can be customized for a particular use depending on the depth of the liquid container, the degree of precision required in the measurements and the particular gauge used and its corresponding circuitry. Weep hole 130 of bottom endcap 26 has a diameter 182 of approximately 0.1 in (0.25 cm). As will be understood by those skilled in the art, other sizes and diameters may be employed for use of the present invention in containers of varying sizes and for use with liquids of varying viscosities.

The exterior wall of the housing also provides an interference-free travel path for the float within the housing such that movement of the float is not hindered by debris that may be contained within the tank.

Therefore, the level sensor according to a preferred embodiment of the present invention provides a fuel level sensor sender unit with an integral housing including a pickup tube and a return tube. A central cavity receives a float therein and a circuit board with plural reed switches and resistors thereon in spaced relation, so as to detect the level of the float (which carries a magnet to actuate the particular reed switch to which the float is adjacent) and thereby determine the level of liquid. An improved combined sender and fuel pickup and return unit is thereby provided.

While a preferred embodiment of the present invention has been shown and described, it will be apparent to those skilled in the art that many changes and modifications may be made without departing from the invention in its broader aspects. For example, those skilled in the art will understand that detection of a fuel level is given as a preferred application but that the level of virtually any liquid can be measured by the present invention. The appended claims are therefore intended to cover all such changes and modifications as fall within the true spirit and scope of the invention.

What is claimed is:

1. A combined liquid level sensor and liquid pickup and return, comprising:
    an elongate housing that defines therein a pickup cavity, a return cavity and a substantially enclosed float cavity, said housing having a longitudinal axis, wherein said pickup cavity, said return cavity and said float cavity are sealed with respect to one another along said longitudinal axis; and
    a float positioned within said substantially enclosed float cavity and adapted for movement therealong,
    wherein said pickup cavity and said return cavity are substantially parallel to one another and substantially coextensive with one another,
    wherein said float cavity is defined between said pickup cavity and said return cavity,
    wherein said float cavity is substantially parallel to said pickup cavity and said return cavity, and
    wherein said float cavity is substantially coextensive with said pickup cavity and said return cavity.

2. A combined liquid level sensor and liquid pickup and return according to claim 1 further comprising a sensor positioned within said float cavity for sensing the position of said float within said float cavity.

3. A combined liquid level sensor and liquid pickup and return according to claim 2 wherein said sensor comprises a plurality of switches.

4. A combined liquid level sensor and liquid pickup and return according to claim 3 wherein said float includes a ferromagnetic material and ones of said plurality of switches comprise magnetically actuated switches.

5. The combined liquid level sensor and liquid pickup and return according to claim 1 further comprising damping means for damping fluctuations of a liquid level within said float cavity.

6. A combined liquid level sensor and liquid pickup and return according to claim 5 wherein said damping means comprises an end of said housing having an aperture therein, said aperture providing for communication between said float cavity and an exterior of the housing and being of a size so as to dampen the effect on a liquid level within the float cavity of sudden fluctuations in a liquid level exterior of the housing.

7. A combined liquid level sensor and liquid pickup and return according to claim 1 wherein said float cavity includes ribs positioned therealong for facilitating movement of said float along said float cavity.

8. A combined liquid level sensor and liquid pickup and return comprising:
    a housing that defines therein a pickup tube, a return tube and a substantially enclosed central cavity as an integral unit, there being substantially no fluid communication between either said pickup tube or said return tube with respect to the central cavity, said pickup tube, said return tube and said central cavity being substantially coextensive with one another; and
    a circuit board positioned within said central cavity and including thereon a plurality of position sensors.

9. A combined liquid level sensor and liquid pickup and return according to claim 8 further comprising a float positioned within said central cavity and adapted for movement therealong.

10. A combined liquid level sensor and liquid pickup and return according to claim 9 wherein said float is a closed cell foam float including a ferromagnetic material enclosed substantially entirely within the closed cell foam.

11. A combined liquid level sensor and liquid pickup and return according to claim 8 further comprising an endcap having an aperture therein, said aperture providing for communication between said central cavity and an exterior of the housing and being of a size so as to damp the effect on a liquid level within the central cavity of sudden fluctuations in a liquid level exterior of the housing.

12. A combined liquid level sensor and liquid pickup and return according to claim 9 wherein said central cavity includes ribs positioned therealong for facilitating movement of said float along said central cavity.

13. A combined liquid level sensor and liquid pickup and return comprising:
    an elongate integral housing that defines therein a pickup cavity, a return cavity and a substantially enclosed liquid level cavity, said pickup cavity, said return cavity and said liquid level cavity being substantially coextensive with one another, fluid communication being substantially absent between said pickup cavity or said return cavity and said liquid level cavity along the extent thereof;

a sensor positioned within said liquid level cavity; and a liquid level sender positioned within said liquid level cavity and adapted for movement within the liquid level cavity for indicating the liquid level to the sensor.

14. A combined liquid level sensor and liquid pickup and return according to claim 13 wherein said sensor comprises a plurality of proximity switches actuated by said liquid level sender.

15. A combined liquid level sensor and liquid pickup and return according to claim 13 wherein said liquid level sender is a closed cell foam float.

16. A combined liquid level sensor and liquid pickup and return according to claim 14 wherein said liquid level sender is a closed cell foam float including a ferromagnetic material enclosed therein for actuating ones of said proximity switches.

17. A combined liquid level sensor and liquid pickup and return according to claim 13 further comprising an endcap having an aperture therein, said aperture providing for communication between said liquid level cavity and an exterior of the housing and being of a size so as to damp the effect on a liquid level within the liquid level cavity of sudden fluctuations in a liquid level exterior of the housing.

18. A combined liquid level sensor and liquid pickup and return according to claim 13 further comprising a dampener for damping the rate of liquid level changes within said liquid level cavity.

19. A combined liquid level sensor and liquid pickup and return according to claim 13 wherein said liquid level cavity includes at least one rib extending along at least a portion of said liquid level cavity.

* * * * *